United States Patent
Butler

[11] Patent Number: 5,938,353
[45] Date of Patent: Aug. 17, 1999

[54] EXPANDABLE KEYBOARD FOR SMALL COMPUTERS AND THE LIKE

[76] Inventor: Robert B. Butler, 650 Union Valley Rd., Mahopac, N.Y. 10541

[21] Appl. No.: 09/040,550

[22] Filed: Mar. 18, 1998

[51] Int. Cl.⁶ .......................................................... B41J 5/10
[52] U.S. Cl. .............................................. 400/492; 400/489
[58] Field of Search ..................................... 400/472, 489, 400/492; 341/22; 361/630; 345/168

[56] References Cited

U.S. PATENT DOCUMENTS 3,900,712   8/1975   Fukao ....................................... 200/307

FOREIGN PATENT DOCUMENTS 9-311744   12/1997   Japan.

*Primary Examiner*—Edgar Burr
*Assistant Examiner*—Daniel J. Colilla

[57] ABSTRACT

An alphanumeric keyboard whose keys have interlocking side edges and are mounted on a scissor-linkage that allows said keyboard to contract to a width that is much narrower than the width of a standard desktop computer keyboard.

9 Claims, 3 Drawing Sheets

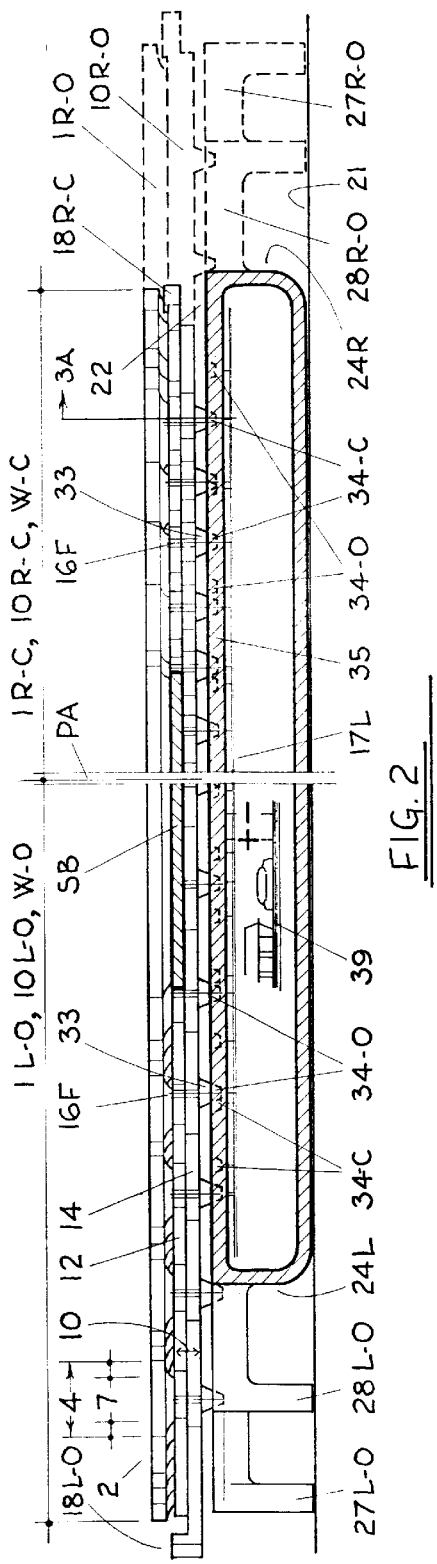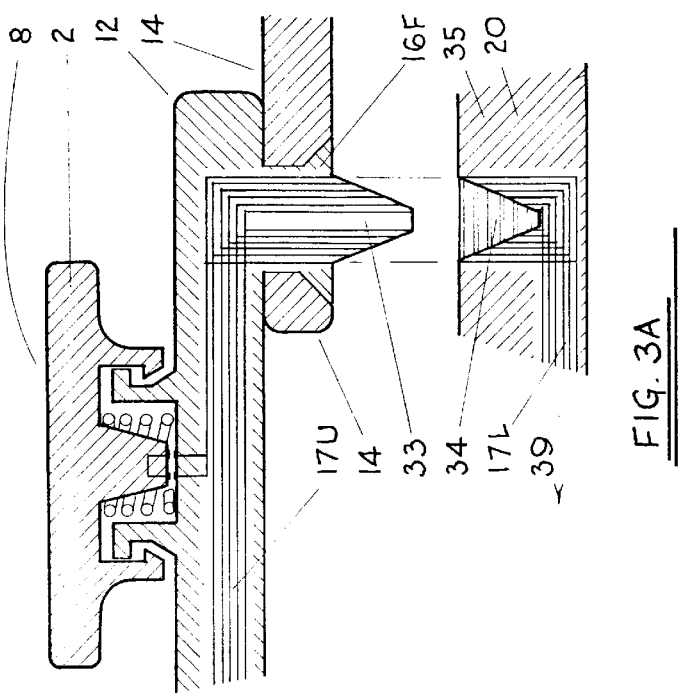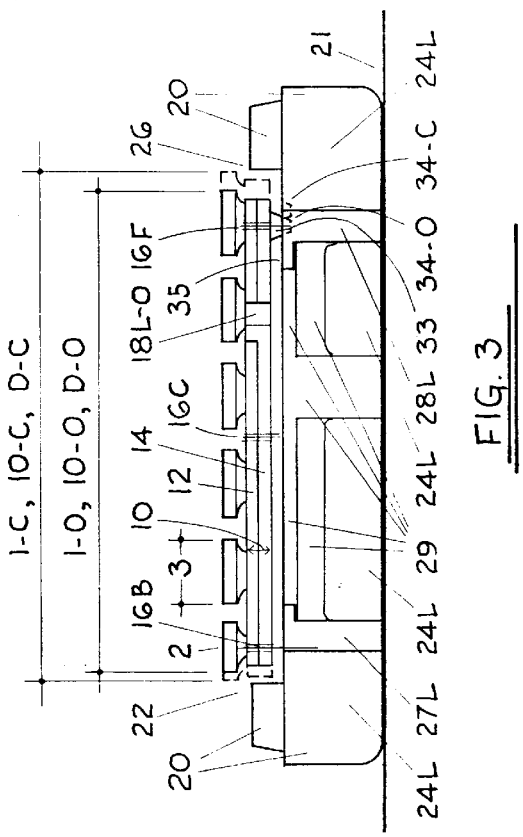

EXPANDABLE KEYBOARD FOR SMALL COMPUTERS AND THE LIKE

FIELD OF THE INVENTION

This invention relates in general to the use of small computers and other lightweight or mobile electronic devices that receive data input by alphanumeric or operational means.

BACKGROUND OF THE INVENTION AND PRIOR ART

Throughout the 1990s the computers that millions of people worldwide now use in their offices and homes have improved at an amazingly rapid rate, to the point that the power and mobility these devices now bring to their users is indeed breathtaking. In particular, the amount of work they can do has greatly increased while at the same time their size has steadily decreased, the latter to the point that today a capacious and multifunctional computer can be made that is no bigger than a common billfold. But such devices have one major limitation: their keyboard keys are presently so tiny and so close together that it is virtually impossible to enter data into them at typical secretarial speed for any length of time. Indeed, in February 1998 one research manager for a major computer maker (Celeste Baranaski of Hewlett-Packard) said: "Unless some breakthrough is made in keyboard technology, many of these smaller travel keyboards just won't work." And in that same month a journalist (David MacNeill of *Pen Computing Magazine*) said of present palmtop computers that their "Inappropriate input methods, such as tiny QWERTY keyboards, hobble us in our attempt to enter our information into a device, wasting our time, and even causing physical pain." Indeed, even a slight reduction in a keyboard's width may significantly reduce a typist's speed —as then the keys are arranged differently than the standard spacing at which one may be accustomed to typing.

However, a few inventors have long been aware of this potential deficit of typewriters, computers, laptops, palmtops, calculators, and other alphanumeric or operational input devices that are designed with versatility and mobility in mind. For example, in 1974 George Margolin in his U.S. Pat. No. 3,940,758 described an EXPANDABLE KEYBOARD FOR ELECTRONIC POCKET CALCULATORS AND THE LIKE, in which "a keyboard of familiar layout for a full-size desk top data terminal is organized in three modular portions," which when closed said three modular portions are arranged in a stacked position as shown in FIG. 7 of Margolin's Patent. But it is obvious that Margolin's invention, while reducing the surface or 'footprint' area occupied by a standard desktop keyboard by about two-thirds, does so at a sacrifice of triply increasing the keyboard's depth, so that such a device could hardly be carried billfold-style in one's pocket or purse. Then in 1991 Adrian Crissan in his U.S. Pat. No. 5,181,644 described a COMPACT PORTABLE COMPUTER HAVING AN EXPANDABLE FULL SIZE KEYBOARD WITH EXTENDIBLE SUPPORTS, in which the outer quarters of his keyboard comprise "a pair of fold-out flaps containing a portion of the keys" which can be rotated upward and inward so that when in closed position said outer quarters lay flat upon the middle half of the keyboard. But this arrangement also considerably increases the parent units depth by the thickness of its folded-over portions, as is obvious from examination of FIG. 1 of Crissan's Patent. A number of other patented keyboards (see esp. Classes 400/88 and 400/682) have their keys arranged in ways that slide to the side or open to the front in various ways, but none of them truly reduce the footprint size of the parent unit as do the two above-cited Patents, nor do they simultaneously allow the parent unit to achieve a billfold size in all dimensions as does the disclosed invention.

SUMMARY OF THE INVENTION

If one looks at a standard keyboard, he or she will note that a significant amount of space exists between the raised side edges of any pair of adjacent keys. In a standard keyboard with 'Chiclet' style keys and a standard 19 mm pitch (center-to-center dimension between two adjacent keys), these intervening voids are usually about one-half the width of each key's top or tactile surface. Thus ff these voids could somehow be maintained when the keys were in standard or 'open' position, yet eliminated when the keys were in contracted or 'closed' position, a keyboard's total width could be reduced by about one-third when closed; then if the sides of each key were given some kind of indented profile so that each pair of adjacent keys would interlock when closed, the distance between their centers could be further reduced until a 28–29 cm wide standard keyboard could easily be fitted into less than the 17–18 cm length of a common billfold —at no increase of depth. This is what the disclosed invention does. Specifically, its keys' side edges have indented profiles that enable any two adjacent keys to interlock at a closer pitch than can occur with normally sided keys, then its keys are mounted on a contractible 'scissor-linkage' comprised of a multiple-X matrix of supporting microbusbars and interconnecting braces, in which the microbusbars carry the electrical code from the operated keys mounted on their tops, and the braces interconnect the microbusbars and stabilize them and the keys above. The microbusbars also have positional guides beneath their front ends that keep the keyboard from sliding or moving out of place whether it is in open or closed position, and these guides have electrical contacts that conduct the electrical code from the keys' micro-circuitry to the computer's operational circuitry located outside the invention, also whether the keyboard is open or closed. The disclosed invention's total assembly of keyboard and scissor-linkage is also thin, so its depth alone will not seriously impact the depth of the parent device in which it is installed.

The utility of the disclosed invention is further enhanced by certain means of trigonometric trickery that seem to deceive the eye. For example, when the scissor-linkage's sides are extended laterally from closed to open position, its front-to-back or longitudinal dimension must necessarily decrease; but surprisingly, when its lateral dimension is increased from 17.7 to 27.8 cm—more than 57 percent—its longitudinal depth decreases by only 9.36−9.13=0.23 cm, or hardly 2 percent. Indeed, at the above dimensions (which were taken from this disclosure's FIG. 1 which was traced from a working model made by the inventor), the disclosed keyboard's surface area when open is actually 53 percent greater than when closed. Thus this keyboard, while greatly increasing the width of its keys when extended to open position, does not create rows of keys whose fronts and backs are too close together when open nor does it seriously affect the longitudinal dimension of its parent device when closed. Another trigonometric trick of the disclosed invention's scissor-linkage is that when it contracts, the keys mounted on it rotate slightly, which allows the keys' indented side edges to interlock in a manner that enables said keys to have the same side-to-side symmetry as, and even greater corner-to-corner dimensions than, those of normal keyboard keys—qualities that make the disclosed keyboard more interestingly attractive and easier to use.

The primary advantage of the disclosed invention is that it allows 'laptop' and 'palmtop' computers and similar lightweight or mobile electronic devices with alphanumeric keyboards to be made small enough to fit into a jacket pocket or purse while allowing their keyboards to be as comfortably usable as those of full-size desktop computers. Such economies of size should lead to corresponding economies of price.

A further advantage of the disclosed invention is that its keys remain fully operable even when in closed position—an advantage that cannot be enjoyed with the above-cited U.S. Pat. Nos. 3,940,758 and 5,187,644. Thus the disclosed invention retains one of the greatest advantages of palmtop computers—that a standing user can hold one in front of him with a single hand while operating its keys with a few fingers or a pen held in the other hand, allowing such a user to easily operate one of these lightweight devices while walking down a hallway, interviewing someone, inventorying shelved merchandise, or even while standing on a moving walkway in an airport.

A further advantage of the disclosed invention is that its keyboard and underlying scissor-linkage can be extended to a width that is three or four times greater than its prescribed open position, in which such extension considerably reduces the assembly's longitudinal depth which pulls the front keys back, exposing the positional guides and/or electrical contacts normally beneath the front ends of the microbusbars, enabling said guides or contacts to be easily cleaned if necessary.

A further advantage of the disclosed invention is that the deeply profiled edges of its individual keys may serve as a more tactile aid to a typist than the usual smooth-edged keys, which may lead to speedier and more accurate data entry.

A further advantage of the disclosed invention is that it may eliminate the tendency of present makers of palmtops and other small computers to remove certain keys which may be important to some users of desktop models in efforts to create a more compact product.

A further advantage of the disclosed invention is that it allows computers of present desktop or laptop capability to be made much more lightweight. For example, the leanest laptop computers today still weigh two or three kilograms, which when carried in a traveler's shoulder bag for several hours can become quite uncomfortable; and such units certainly cannot be carried easily in one hand. On the other hand, several of today's palmtops—some of which have 16 MB of RAM, 256-color displays, PC card slots, serial interfaces, and built-in batteries and allow one to "run Windows anywhere" and communicate via Email—weigh less than 0.5 kilograms. Such units (typical dimensions=20× 12×3 cm) also take up less than 20 percent of the volume of their typically 30×22×6 cm laptop counterparts.

Another possible advantage of the disclosed invention is that the keys' deeply indented profiles may impart an eye-catching character to the device in which they are installed, which should make such devices highly marketable.

BRIEF DESCRIPTION OF THE DRAWINGS

Although great latitude exists regarding the optimal sizing and configuring of many of the disclosed invention's various elements—for example the selection and arrangement of individual keyboard keys, spacing and lateral depth of the keys' interlocking profiles, footprint dimensions of the keyboard when open or closed, and the lengths and cross-sections of the scissor-linkage's microbusbars and braces—in which any of such various elements when considered individually may not necessarily represent the most preferred embodiment of its portion of the invention, yet each of such various elements of the disclosed invention when considered collectively may be said to have a preferred embodiment, as follows:

FIG. 2 is a section through the parent computer showing the front of the keyboard and its underlying scissor-linkage with the right half shown in open position and the left half in closed position; in which the outline of the right half when open (R-O), outline of the left half when closed (L-C), and outline of the leg that swings out from the computer's right front side to support this side of the keyboard when open are all shown in dotted lines.

FIG. 3 is a left side view of the keyboard and its underlying scissor-linkage when in open position, in which the outline of the total assembly when closed (RL-C) is shown in dotted lines. A right side view of this assembly is essentially a mirror image of the left side view.

FIG. 3A is an enlarged section through one of the connectors that also serves as a positional guide and electrical contact between the invention and the computer below, in which a typical schematic of the micro-circuitry from any key to the computer's operational circuitry is shown.

Figure 1:
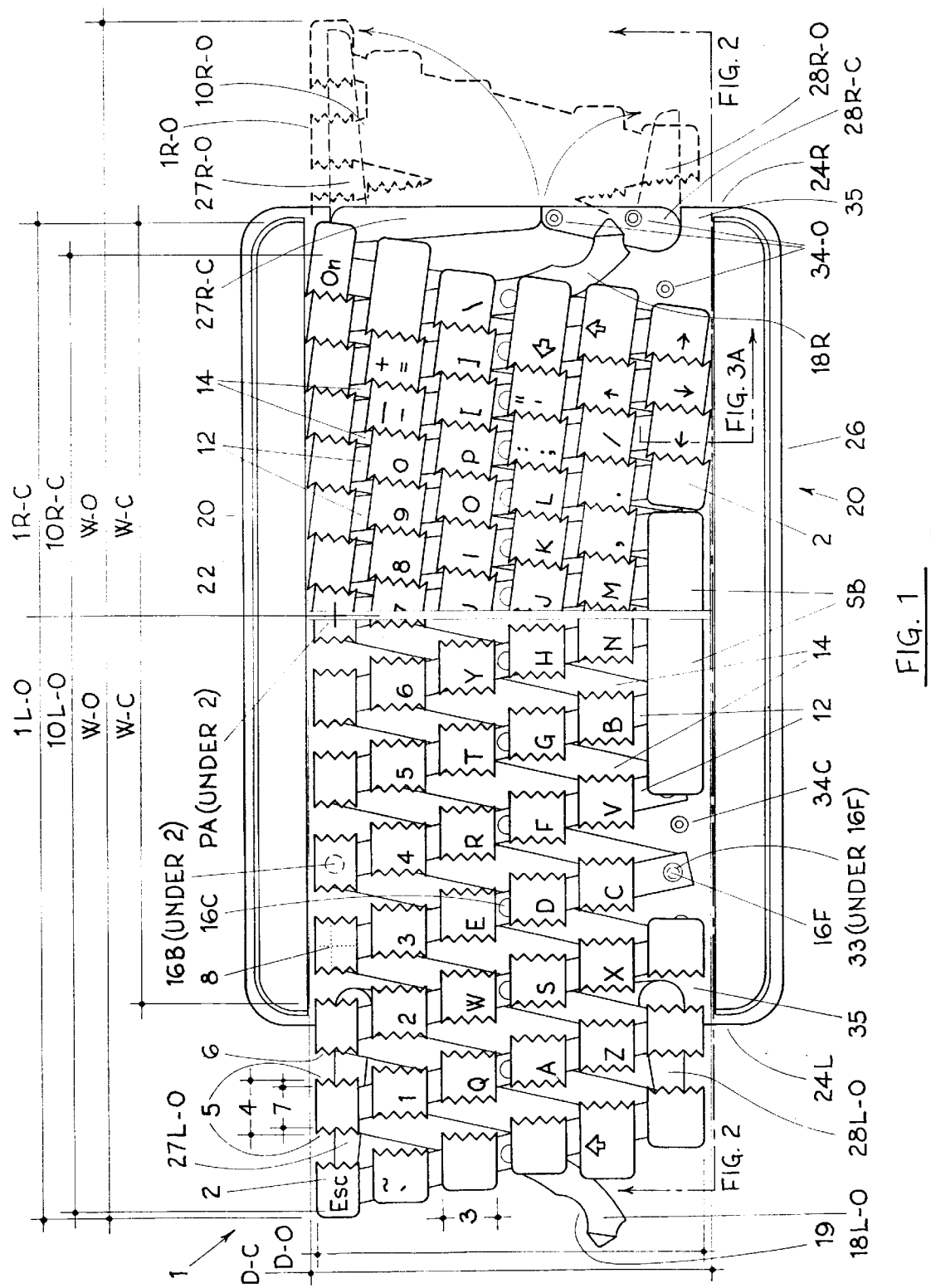
FIG. 1 is a top view of a keyboard and its underlying scissor-linkage with its left half in open or expanded position and its right half in closed or contracted position; in which the outline of the right half when open (R-O), outline of the left half when closed (L-C), and outline of the two legs that extend from the computer's right side to support this side of the keyboard when open are shown in dotted lines. In this view, note that the keyboard's front-to-back dimension increases only slightly from D-O to D-C as its lateral dimension decreases greatly from W-C to W-O.

In the figures that comprise the drawings, the following numbers and letters are used to denote various portions and characteristics of the disclosed invention, as follows:
1. Keyboard (left side=1LO, right side=1R, open32 1-O, closed=1C)
2. Individual key
3. Longitudinal depth of key 2
4. Total lateral width of key 2
5. Side edge of key 2
6. Indented profile of key 2
7. Indent width of indented profile 6
8. Top or tactile surface of key 2
10. Scissor-linkage (left side=10L, right side=10R, open= 10-O, closed=10-C)
12. Microbusbar of scissor-linkage 10
14. Brace of scissor-linkage 10
16. Connector of microbusbar 12 and brace 14 (back connector=16B, center connector=16C, front connector= 16F)
17. Microconductor (in disclosed invention=17U, in parent computer=17L)
18. Handle (left side=18L, right side=18R, open=18-O)
19. Indent on handle 18
20. Frame of computer
22. Back of frame 20

24. Side of frame 20 (left side=24L, right side=24R)
26. Front of frame 20
27. Upper keyboard support (left side=27R, right side=27R, open=27-O, closed=27-C)
28. Lower keyboard support (left side=28L, right side=28R, open=28-0, closed=28-C)
29. Keyboard support indents in side of frame 20
33. Projecting positional guide on underside of connector 16F
34. Indented positional guide in computer chassis 35
35. Computer chassis
37. Circuitry board (or equal) inside computer
39. Computer's operating circuitry
PA. Pivot anchor of keyboard 1/scissor-linkage 10
SB. Spacebar in keyboard 1
W. Standard key width (FIG. 4 only)
D. Standard key depth (FIG. 4 only)
S. Straight side edges of standard key (lag. 4 only)
D-O. Longitudinal depth of keyboard 1 when open
D-C. Longitudinal depth of keyboard 1 when open
W-O. Lateral width of keyboard 1 when open
W-C. Lateral width of keyboard 1 when closed

DETAILED DESCRIPTION AND OPERATION OF THE INVENTION

Referring to the accompanying drawings that describe a preferred embodiment of the disclosed invention in detail, and initially to FIG. 1 thereof: this top view shows the left half of keyboard 1 and its underlying scissor-linkage 10 in extended or open position and its right half in contracted or closed position, in which the division between the two halves occurs at the centrally located pivot anchor PA (described in greater detail below), in which each key 2 (not including space bar SB centered in the bottom row) has a typical alphanumeric or operational notation on its top or tactile surface 8.

Referring to the keys collectively 1: each key 2 has a longitudinal depth 3, total width 4, and side edges 5, with at least one of side edges 5 having an indented profile 6 that allows any two adjacent keys to interlock at an indent width 7 which is part of each key's total width 4. Indent width 7 allows the total width 4 of each key's top 8 to remain the same as the full width of standard-sized keyboard keys when each key 2 is in open position, yet indent widths 7 also enable the center-to-center dimensions of any two adjacent keys 2 to be less than those of two normally-sided keys placed side-to-side. Regarding spacebar SB, this elongate key centered in the bottom row of keys is connected to the computer's frame front 26 so that it remains stationary while all the other keys 2 are extended or contracted around it, with such extension causing keys 2 to rotate slightly (which would be desirable for keys 2 as explained further below) while such rotation would be undesirable for a key as long as spacebar SB. However, in other equally useful embodiments of the invention, spacebar SB could have one end, or its center, rotatably anchored to one part of the underlying scissor-linkage 10 and its other end, or both ends, slidably anchored to other parts of scissor-linkage 10 so that spacebar SB would not rotate as keyboard 1 is extended or contracted.

Referring to the keys' scissor-linkage 10: this multiple-X matrix is constructed primarily of a number of essentially horizontal and parallel microbusbars 12 (which in FIG. 1 are oriented slightly to the left of vertical), a similar but not necessarily exact number of essentially horizontal and parallel braces 14 (which in FIG. 1 are oriented slightly to the right of vertical), and three rows of connectors 16 located where the back ends of microbusbars 12 and braces 14 intersect (connectors 1GB), their centers intersect (connectors 16C) and their front ends intersect (connectors 16F). Microbusbars 12 support the individual keys 2 mounted on top of said bars and include the micro-circuitry that conducts the electrical code from any operated key 2 to the computer's operational circuitry 39 located outside the invention. Braces 14 are made of a material that is structurally strong enough to stabilize the microbusbars 12 and the keys 2 upon them erect while said keys withstand the finger forces imposed upon them during their operation. Connectors 16 transfer the required stability imparted from braces 14 to microbusbars 12, allow the rotation of microbusbars 12 against braces 14 through connectors 16 when keyboard 1 is opened or closed, and carry the microcircuitry that conducts the electrical code from any operated key 2 to the computers operational circuitr 39 outside the invention.

In this particular embodiment of the disclosed invention, the back connector 16B under key F7 (the centermost key in the top row of keys) is extended downward to form an essentially vertical pivot anchor PA that prevents the invention as a whole from becoming separated from the computer and holds key 7 approximately stationary while all the other keys are extended or contracted; in which the upper portion of pivot anchor PA allows its proximate microbusbar 12 and brace 14 to rotate about its axis while the downward portion of pivot anchor PA is anchored in the computer chassis 35 that underlies scissor-linkage 10. In other embodiments of the disclosed invention, pivot anchor PA could be located at the bottom of the total keyboard/scissor-linkage assembly, under the centermost front connector 16F, instead of at the top.

In this particular embodiment of the disclosed invention, keyboard 1 is positioned accurately and prevented from moving laterally while its keys 2 are being operated in either open or closed position by providing each front connector 16F with a projecting positional guide 33 on its underside so that said guide 33 will mate with a similarly sized indented positional guide 34 mounted on the computer chassis 35 on which the scissor-linkage 10 rests; in which all the projecting guides 33 mate with one row of indented guides 34-C when scissor-linkage 10 is in closed position, then the same guides 33 mate with another row of indented guides 34-O when scissor-linkage 10 is in open position. In other embodiments of the disclosed invention, similar positional guides 33 and 34 could be located at the top of the total keyboard/ scissor-linkage assembly instead of at the bottom.

In this particular embodiment of the disclosed invention, positional guides 33 and 34 also conduct the electronic code from any activated key 2 to the parent computer's operational circuitry through electric contacts located on the mating surfaces of said guides 33 and 34. This is shown in FIG. 3A, an enlarged section through a front connector 16F which includes a schematic of the microcircuitry between key 2 and the computer's operational circuitry 39. Although there are many ways in which such microcircuitry is present in today's computers, this particular schematic shows microconductors 17U carrying the electrical code from any activated key 2 through microbusbar 12, connector 16F, and projecting positional guide 33 to indented positional guide 34, where mating microconductors 17L conduct said electrical code through computer chassis 35 to a circuitry board (or equal) 37 inside the computer and subsequently to the computer's operational circuitry 39. In still other embodiments of the disclosed invention, the electrical code from keys 2 could be conducted through the back connectors 16B instead of the front connectors 16F; or said conductance could occur via wireless means (i.e. infrared or remote control) directly from keys 2 or microbusbars 12 to the computer's operational circuitry 39.

In this particular embodiment of the disclosed invention, the rightmost microbusbar 12 and leftmost brace 14 of scissor-linkage 10 project outward toward the keyboard's front to form two handles 18R and 18L to facilitate the opening and closing of keyboard 1, and each handle 18 has indents 19 that allow the tips of one's thumb and forefinger to more easily grasp the ends of handles 18. In other embodiments of the disclosed invention, handles 18 could have indents, pads, projections, or any combination thereof that would optimize the opening and closing of keyboard 1.

Referring to the frame 20 around keyboard 1: although frame 20 can have many sizes and configurations (or even lack thereof), in this embodiment of the disclosed invention frame 20 has a back 22, left and right sides 24L and 24R, a front 26, two upper keyboard supports 27L and 271R, and two lower keyboard supports 28L and 28R. Upper supports 27L and 27R extend from the vicinity of the frame's upper left and right corners to provide support for the keyboard's uppermost and outermost keys 2 when in open position, while lower supports 28L and 28R extend from the vicinity of the frame's lower left and right corners to provide support for the keyboard's lowermost and outermost keys 2 when in open position. Lower keyboard supports 28L and 28R also have on their tops the outermost positional guides 34 that receive corresponding positional guides 33 on the underside of scissor-linkage 10 when keyboard 1 is in open position.

Referring to FIG. 2 of the drawings: this section shows the left half of keyboard 1 and scissor-linkage 10 in open position and their right halves in closed position. In particular this view shows keys 2 mounted upon rows of microbusbars 12, rows of braces 14 located just below, projecting positional guides 33 that mate with indented positional guides 34 (outlined in dotted lines) in computer chassis 35, and the right front keyboard support 28R in open position (outlined in dotted lines).

Referring to FIG. 3 of the drawings: this left side view of the keyboard/scissor-linkage assembly in open position shows several keyboard keys 2 mounted on top of leftmost microbusbar 12, leftmost brace 14 just below which includes projecting handle 18L, leftmost keyboard supports 27L and 28L in open position, and projecting positional guides 33 which mate with the row of indented positional guides 34-C (shown in dotted lines) when keyboard 1 is in closed position and which mate with the row of indented positional guides 34-O (shown in dotted lines) when keyboard 1 is in open position.

Figure 4:
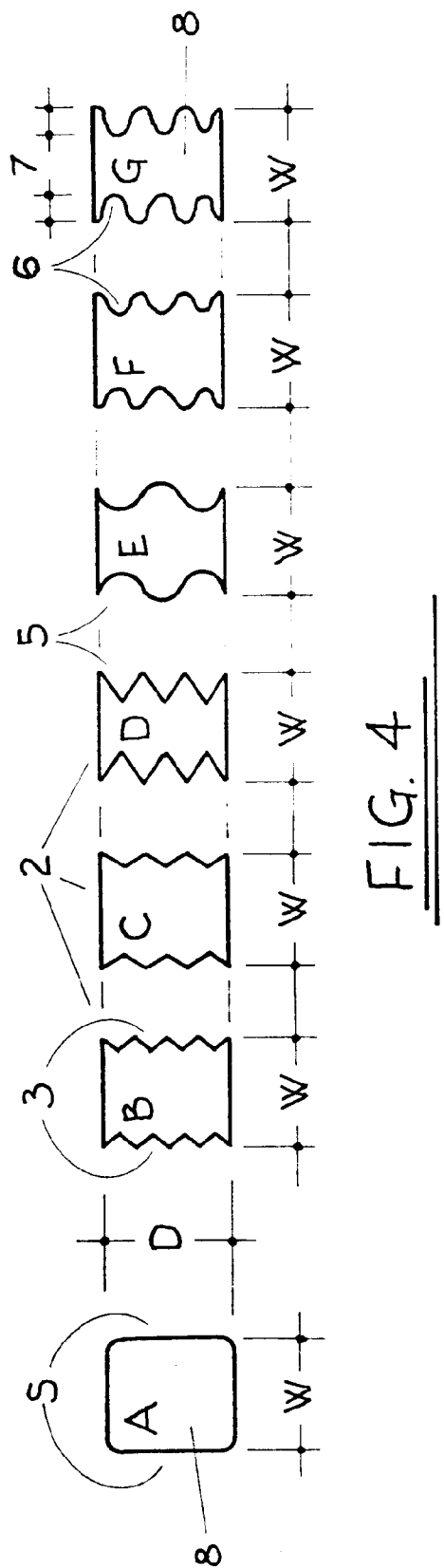
FIG. 4 shows top views of several individual keys, in which key A is of standard size and shape while keys B, C, D, E, F, and G have side edges with various interlocking profiles.

Referring to FIG. 4 of the drawings: in this top view of several actually-sized keyboard keys, key A is an outline of a typical 'Chiclet' style key found on a standard-size computer keyboard. Note the rectangular aspect of key A's tactile surface, its standard width W, standard depth D, and straight side edges S; then note that keys B, C, D, E, F, G, and H have the same width W and depth D as key A but their side edges have various indented profiles 6 which allow any two adjacent keys B through H having the same profiles to interlock so their centers will be closer together than could occur with two side-to-side keys A.

Although the invention has been described in a particular embodiment with a certain degree of particularity, it should be understood that this disclosure of said embodiment has been made only by way of example, and that the combination and arrangement of said embodiments' various elements, as well as any number of changes in construction and aesthetic details, may be resorted to without departing from the essential scope and spirit of the invention as hereinafter claimed; and that the patent if granted shall cover, by suitable interpretation of the appended claims, whatever features of variety that would be compatible with the essence of what is claimed:

1. A keyboard composed of several rows of essentially horizontal and electrically activated alphanumeric and operational keys that are used to enter data into a computer or other device on which said keyboard is installed, in which said keys have indented side edges and are mounted on an essentially horizontal scissor-linkage in a manner that enables said keys to be expanded or contracted laterally into an 'open' or 'closed' position, with said open position having the approximate width of a standard-sized computer keyboard and said closed position being considerably narrower; in which said indented side edges of said keys have interlocking profiles that enable the center-to-center dimensions of any two adjacent keys to be less when touching each other than if said keys had side edges that were straight;

said scissor-linkage includes a plurality of essentially parallel and equidistant microbusbars, each of elongate shape, each of which supports several of said keys on its top, and each of which includes circuitry for conducting electricity from said mounted keys to the operational circuitry of said computer or other device on which said keyboard is installed;

said scissor-linkage includes a plurality of essentially parallel and equidistant braces, each of elongate shape, each of which is interconnected to said microbusbars in a way that stabilizes said microbusbars and said keys upon said microbusbars whether said keyboard is in open or closed position; and said scissor-linkage includes a plurality of connectors that hold together said microbusbars and braces at their backs, centers, and fronts in a way that interstabilizes said microbusbars and braces and allows them to rotate against each other in a manner that forms an expandable and contractible multiple-X assembly of said microbusbars, braces, and connectors.

2. A keyboard according to claim 1 in which said keys are mounted so that they rotate in a manner that enables said interlocking profiles of any two adjacent keys to provide every key except the end keys in each row with a top surface that is symmetrical side-to-side.

3. A keyboard according to claim 1 that includes a pivot anchor whose lower portion connects to said computer or other device on which said keyboard is installed and whose upper portion fixes in one place a laterally central point of said keyboard while allowing all other parts of said keyboard to move inward or outward.

4. A keyboard according to claim 1 that includes movable positional guides on or near the underside of said keyboard in which said guides accurately locate said keys and keep them from moving whether said keyboard is in open or closed position.

5. A keyboard according to claim 1 that includes electrical contacts on or near its underside in which said contacts conduct electricity from said keys to the operational circuitry of the computer or other device in which said keyboard is installed whether said keyboard is in open or closed position.

6. A keyboard according to claim 1 that includes movable supports that extend from under the sides of said keyboard and support its outermost keys when in open position.

7. A keyboard according to claim 6, in which said movable supports contain positional guides that accurately locate said keyboard's outermost keys and keep them from moving when in open position.

8. A keyboard according to claim 6, in which said movable supports contain electrical contacts that conduct electricity from said keyboard's outermost keys to the operational circuitry of said computer or other device on which said keyboard is installed when said outermost keys are in open position.

9. A keyboard according to claim 1 that includes two projecting handles, one on each side of said keyboard, that aid the opening or closing of said keyboard, in which said handles include indents, pads, and/or projections that further aid the opening or closing of said keyboard.

* * * * *